US008687981B2

(12) United States Patent
Welch et al.

(10) Patent No.: US 8,687,981 B2
(45) Date of Patent: Apr. 1, 2014

(54) METHOD AND SYSTEM FOR SPLIT VOLTAGE DOMAIN TRANSMITTER CIRCUITS

(75) Inventors: Brian Welch, San Diego, CA (US); Daniel Kucharski, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 1392 days.

(21) Appl. No.: 12/208,650

(22) Filed: Sep. 11, 2008

(65) Prior Publication Data

US 2009/0087196 A1 Apr. 2, 2009

Related U.S. Application Data

(60) Provisional application No. 60/997,282, filed on Oct. 2, 2007.

(51) Int. Cl.
*H04B 10/06* (2011.01)
(52) U.S. Cl.
USPC ........... 398/202; 398/208; 398/209; 398/210; 455/343.1; 455/341; 375/247; 375/297; 375/318; 375/319; 372/38.02; 372/38.07; 330/124 R
(58) Field of Classification Search
USPC .............. 398/202, 208, 209, 210; 455/343.1, 455/341; 375/247, 297, 318, 319; 372/38.02, 38.07; 330/124 R
See application file for complete search history.

(56) References Cited

U.S. PATENT DOCUMENTS

| | | | | |
|---|---|---|---|---|
| 4,107,618 A | * | 8/1978 | Ormond | 330/51 |
| 4,168,471 A | * | 9/1979 | Sampei | 330/264 |
| 4,786,878 A | * | 11/1988 | Botti | 330/84 |
| 5,796,306 A | * | 8/1998 | Tsumura | 330/124 R |
| 5,808,480 A | * | 9/1998 | Morris | 326/81 |
| 5,867,061 A | * | 2/1999 | Rabjohn et al. | 330/124 R |
| 6,069,525 A | * | 5/2000 | Sevic et al. | 330/51 |
| 6,323,734 B1 | * | 11/2001 | Henrion et al. | 330/308 |
| 6,970,152 B1 | * | 11/2005 | Bell et al. | 345/100 |

FOREIGN PATENT DOCUMENTS

WO WO 2006022931 A2 * 3/2006 ............... G02B 6/10

OTHER PUBLICATIONS

Horowitz et al., "The Art of Electronics," 1989, Cambridge University Press, 2nd Ed, 133.*

(Continued)

*Primary Examiner* — Jessica Stultz
*Assistant Examiner* — Joshua King
(74) *Attorney, Agent, or Firm* — McAndrews, Held & Malloy

(57) ABSTRACT

Methods and systems for split voltage domain transmitter circuits are disclosed and may include amplifying a received signal in a plurality of partial voltage domains. Each of the partial voltage domains may be offset by a DC voltage from the other partial voltage domains. A sum of the plurality of partial domains may be equal to a supply voltage of the integrated circuit. A series of diodes may be driven in differential mode via the amplified signals. An optical signal may be modulated via the diodes, which may be integrated in a Mach-Zehnder or a ring modulator. The amplified signals may be communicated to the diodes, connected in a distributed configuration, via even-mode coupled transmission lines. The partial voltage domains may be generated via stacked source follower or emitter follower circuits. The voltage domain boundary value may be at one half the supply voltage due to symmetric stacked circuits.

22 Claims, 10 Drawing Sheets

(56) References Cited

OTHER PUBLICATIONS

Fonstad, "Lecture 21—Diff-Amp Anal. II: Output Stages—Outline," 2009, slide 11. [online]. MIT Open Courseware, 2009 [retrieved on Apr. 15, 2013]. Retrieved From the Internet: <http://ocw.mit.edu/courses/electrical-engineering-and-computer-science/6-012-micro-electronic-devices-and-circuits-fall-2009/lecture-notes/MIT6_012F09_lec21.pdf>.*

Yuan et al., "Modelling of Coupled Interconnect Lines for Integrated Circuits," 1991, Int. J. Electronics., vol. 70, No. 4, 751-764.*

* cited by examiner

METHOD AND SYSTEM FOR SPLIT VOLTAGE DOMAIN TRANSMITTER CIRCUITS

CROSS-REFERENCE TO RELATED APPLICATIONS/INCORPORATION BY REFERENCE

This application makes reference to and claims priority to U.S. Provisional Application Ser. No. 60/997,282 filed on Oct. 2, 2007, which is hereby incorporated herein by reference in its entirety.

This application also makes reference to:
U.S. Pat. No. 7,039,258; and
U.S. patent application Ser. No. 12/208,668 filed on Sep. 11, 2008.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to integrated circuit power control. More specifically, certain embodiments of the invention relate to a method and system for split voltage domain transmitter circuits.

BACKGROUND OF THE INVENTION

Electronic circuits typically require a bias voltage for proper operation. The voltage level required by a circuit depends on the application. A circuit for signal transmission may require a higher voltage than a circuit used for processing data. The optimum voltage may be determined by the bias voltage requirements of the transistors, or other active devices, within the circuit.

A bipolar transistor circuit may require a higher voltage in amplifier applications to avoid saturation of the amplifier, as opposed to switching operations, for example. CMOS circuits may require a lower voltage to drive the MOSFETs in the circuit.

Furthermore, as device sizes continue to shrink for higher speed and lower power consumption, a high voltage may degrade performance and cause excessive leakage. With thinner gate oxides, gate leakage current may become significant using historical bias voltages, thus driving gate voltages lower. However, if a transmitter/receiver may be integrated in the same device, a higher bias voltage may also be required. Bias voltages are typically DC voltage, and may be supplied by a battery. However, there may be noise in the bias voltage, which may be mitigated by capacitive filters. The variable output voltage of batteries my affect operation of battery powered devices. Devices generally must be capable of operating over a large range of voltage due to the variable output voltage capability of batteries.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for split voltage domain transmitter circuits, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for split voltage domain transmitter circuits. Exemplary aspects of the invention may comprise amplifying a received signal in a plurality of partial voltage domains. Each of the partial voltage domains may be offset by a DC voltage from the other partial voltage domains. A sum of the plurality of partial domains may be equal to a supply voltage of the integrated circuit. A series of diodes may be driven in differential mode via the amplified signals. An optical signal may be modulated via the diodes, which may be integrated in a Mach-Zehnder modulator or a ring modulator, for example. The diodes may be connected in a distributed configuration. The amplified signals may be communicated to the diodes via even-mode coupled transmission lines. The partial voltage domains may be generated via stacked source follower or emitter follower circuits. The voltage domain boundary value may be at one half the supply voltage due to symmetric stacked circuits.

Figure 1A:
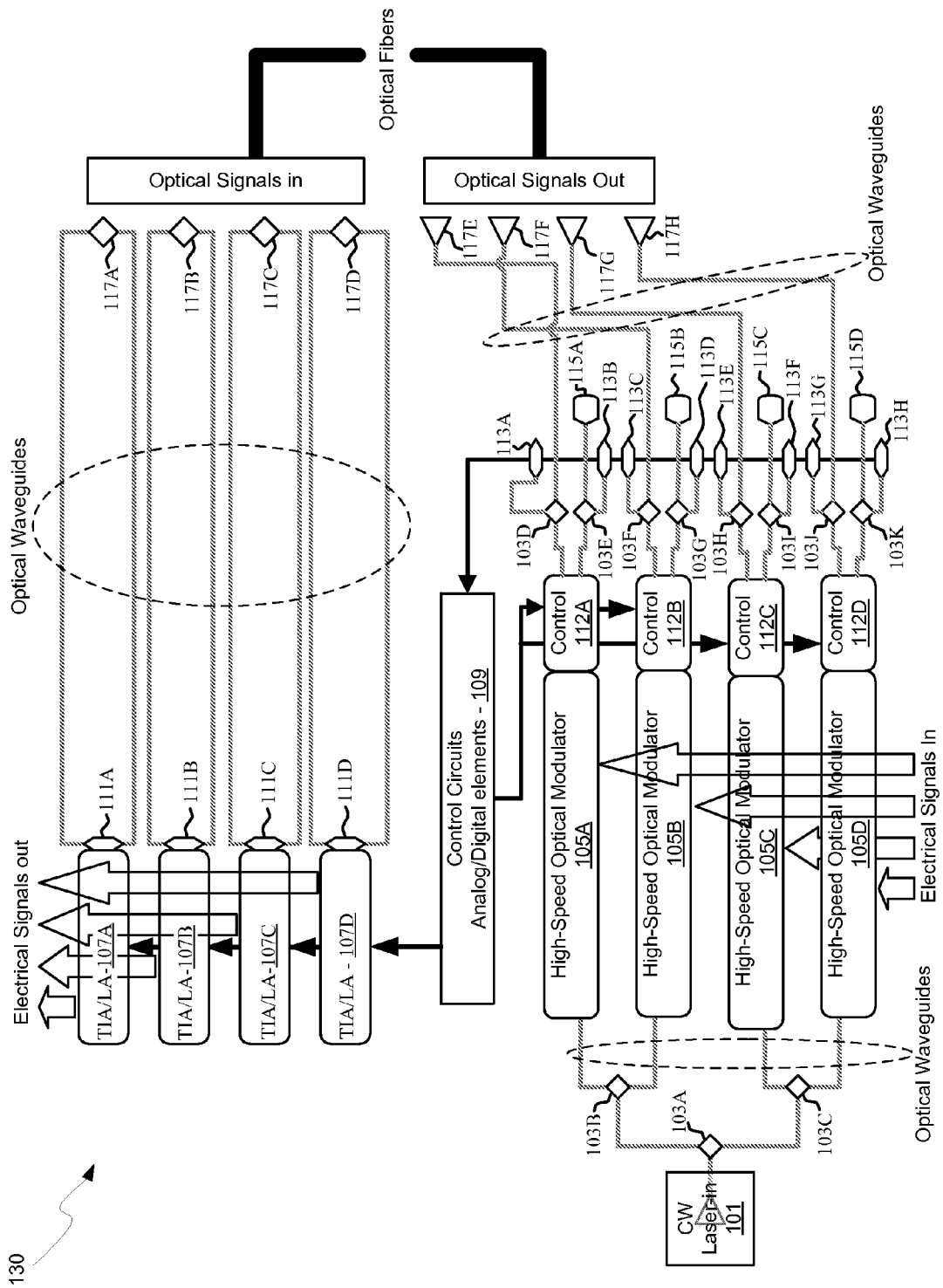
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107D, analog and digital control circuits 109, and control sections 112A-112D. Optical signals are communicated between optical and optoelectronic devices via optical waveguides fabricated in the CMOS chip 130.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D then communicate electrical signals off the CMOS chip 130.

The control sections 112A-112D comprise electronic circuitry that enable modulation of the CW laser signal received from the splitters 103A-103C. The high speed optical modulators 105A-105D require high-speed electrical signals to modulate the refractive index in respective branches of a Mach-Zehnder interferometer (MZI), for example. The voltage swing required for driving the MZI is a significant power drain in the CMOS chip 130. Thus, if the electrical signal for driving the modulator may be split into domains with each domain traversing a lower voltage swing, power efficiency is increased.

Figure 1B:
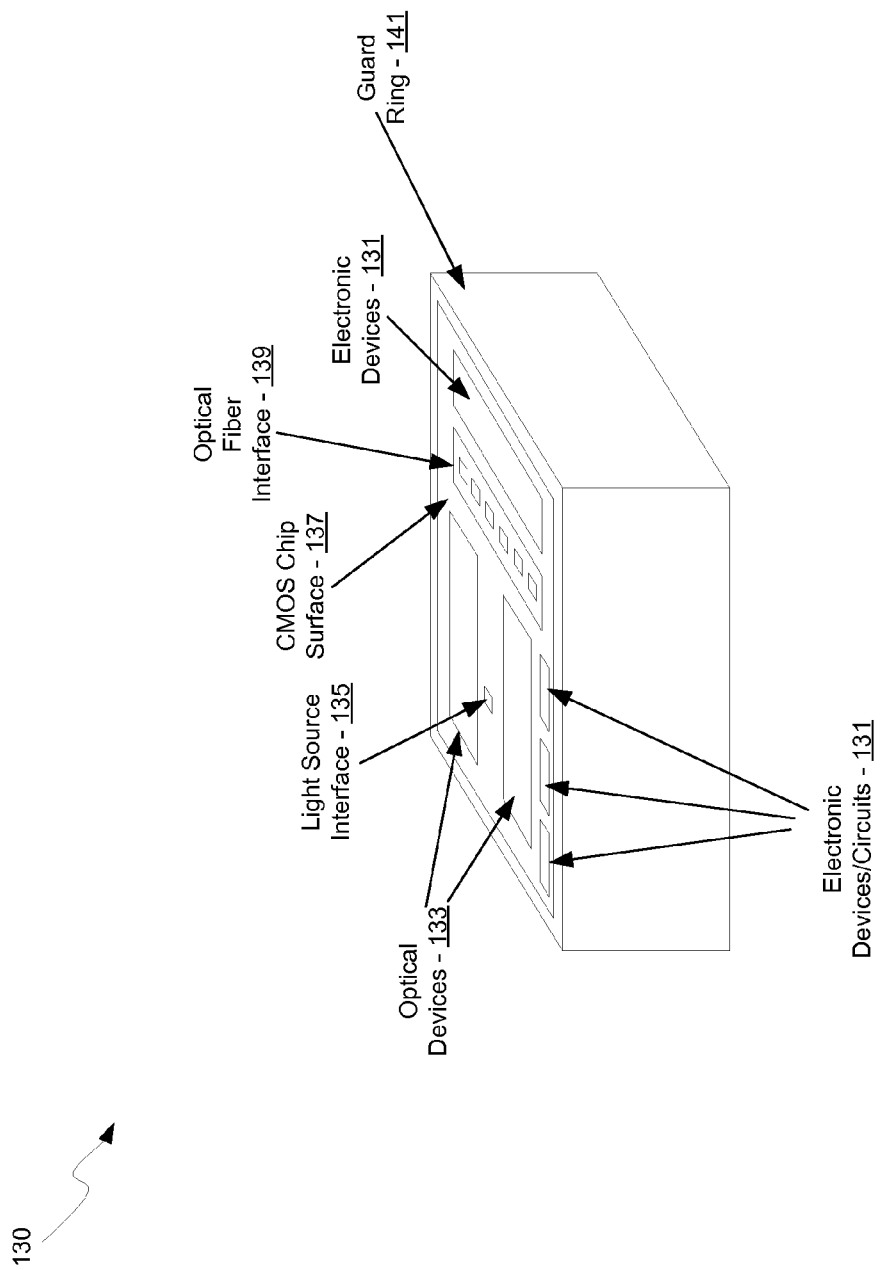
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip surface 137, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, high speed optical modulators 105A-105D, high-speed photodiodes 111A-111D, and monitor photodiodes 113A-113H.

Figure 1C:
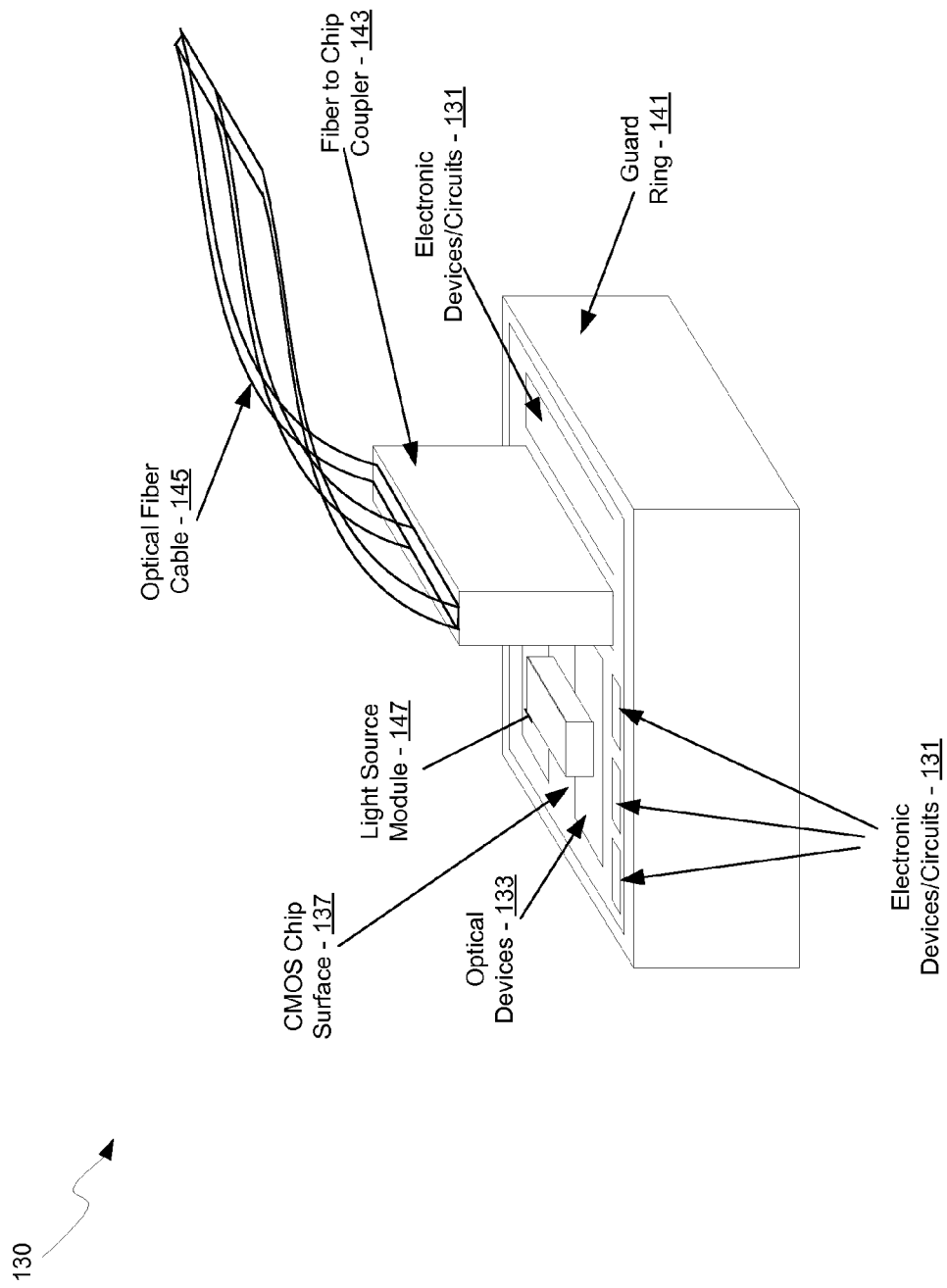
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the electronic devices/circuits 131, the optical and optoelectronic devices 133, the light source interface 135, the CMOS chip surface 137, and the CMOS guard ring 141. There is also shown a fiber to chip coupler 143, an optical fiber cable 145, and a light source module 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

The light source module 147 may be affixed, via epoxy or solder, for example, to the CMOS chip surface 137. In this manner a high power light source may be integrated with optoelectronic and electronic functionalities of one or more high-speed optoelectronic transceivers on a single CMOS chip.

The power requirements of optoelectronic transceivers is an important parameter. Minimizing voltage swings is one option for reducing power usage, and modulating light at multi-gigabit speeds typically requires higher voltages than needed for high-speed electronics. Thus, a multi-voltage domain architecture in the modulator driver circuitry reduces the voltage requirements, and thus improved power efficiency, by driving the circuitry in each domain over a smaller voltage range than the entire voltage swing.

Figure 1D:
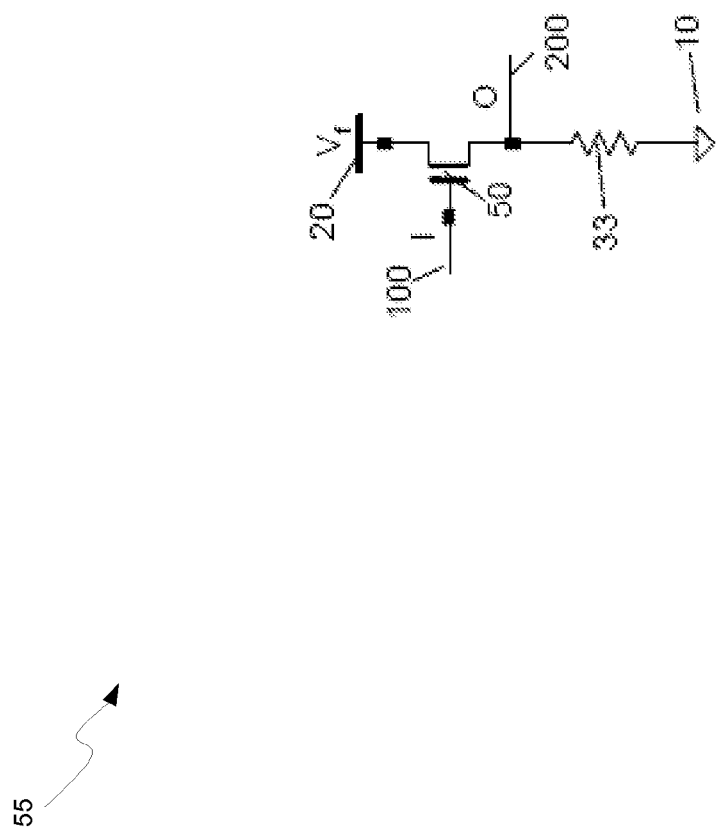
FIG. 1D is a block diagram of an exemplary n-type field effect transistor circuit, in accordance with an embodiment of the invention.

FIG. 1D is a block diagram of an exemplary n-type field effect transistor circuit, in accordance with an embodiment of the invention. Referring to FIG. 1D, there is shown a source follower circuit 55 comprising an n-channel field effect transistor (NFET) 50, a resistor 33, a high rail 20, and a low rail 10. There is also shown a circuit input 100 and a circuit output 200.

The source follower circuit 55 has two power rails, comprising the high rail 20 biased at a voltage $V_f$, or full voltage, and the low rail 10, marked with the customary symbol of "ground". The circuit has an input 100 on the gate of the NFET 50, while the circuit output 200 is on the NFET source side, or simply source. The NFET 50 drain side, or drain, is connected to the high rail 20. The resistor 33 is coupled between the source terminal of the NFET 50 and the low rail 10, completing an electrical path between the high 20 and low 10 rails.

In operation, an input signal is applied to the input 100. The source follower circuit 55 may be utilized to lower the impedance level in the signal path, drive resistive loads, or to provide DC level shifting, since the gate-source DC voltage drop may be controllable by the bias current. The gain of the source follower circuit 55 may be near unity, resulting in a AC output signal at the circuit output 200, but with a configurable DC output level.

Figure 1E:
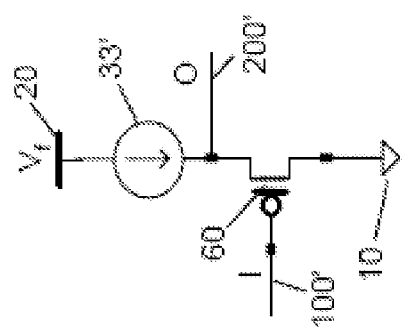
FIG. 1E is a block diagram of an exemplary p-type field effect transistor circuit, in accordance with an embodiment of the invention.

FIG. 1E is a block diagram of an exemplary p-type field effect transistor circuit, in accordance with an embodiment of the invention. Referring to FIG. 1E, there is shown a source follower circuit 65 comprising a p-channel field effect transistor (PFET) 60, a current source 33', a high rail 20, and a low rail 10. There is also shown a circuit input 100' and a circuit output 200'.

The PFET source follower has two power rails, comprising a high rail 20 at a voltage $V_f$, or full voltage, and a low rail 10, marked with the "ground" symbol. The circuit has an input 100' on the PFET 60 gate, while the circuit output 200' is on the PFET 60 source side, or simply source. The PFET 60 drain side, or drain, is connected to the low rail 10. The current source 33' is coupled to the high rail 20 and the PFET 60 source, completing an electrical path between the high 20 and low 10 rails.

In operation, an input signal is applied to the input 100'. The source follower circuit 65 may be utilized to lower the impedance level in the signal path, drive resistive loads, or to provide DC level shifting, since the gate-source DC voltage drop may be controllable by the bias current. The gain of the source follower circuit 65 may be near unity, resulting in a similar AC output signal at the circuit output 200', but with a configurable DC output level.

Figure 2:
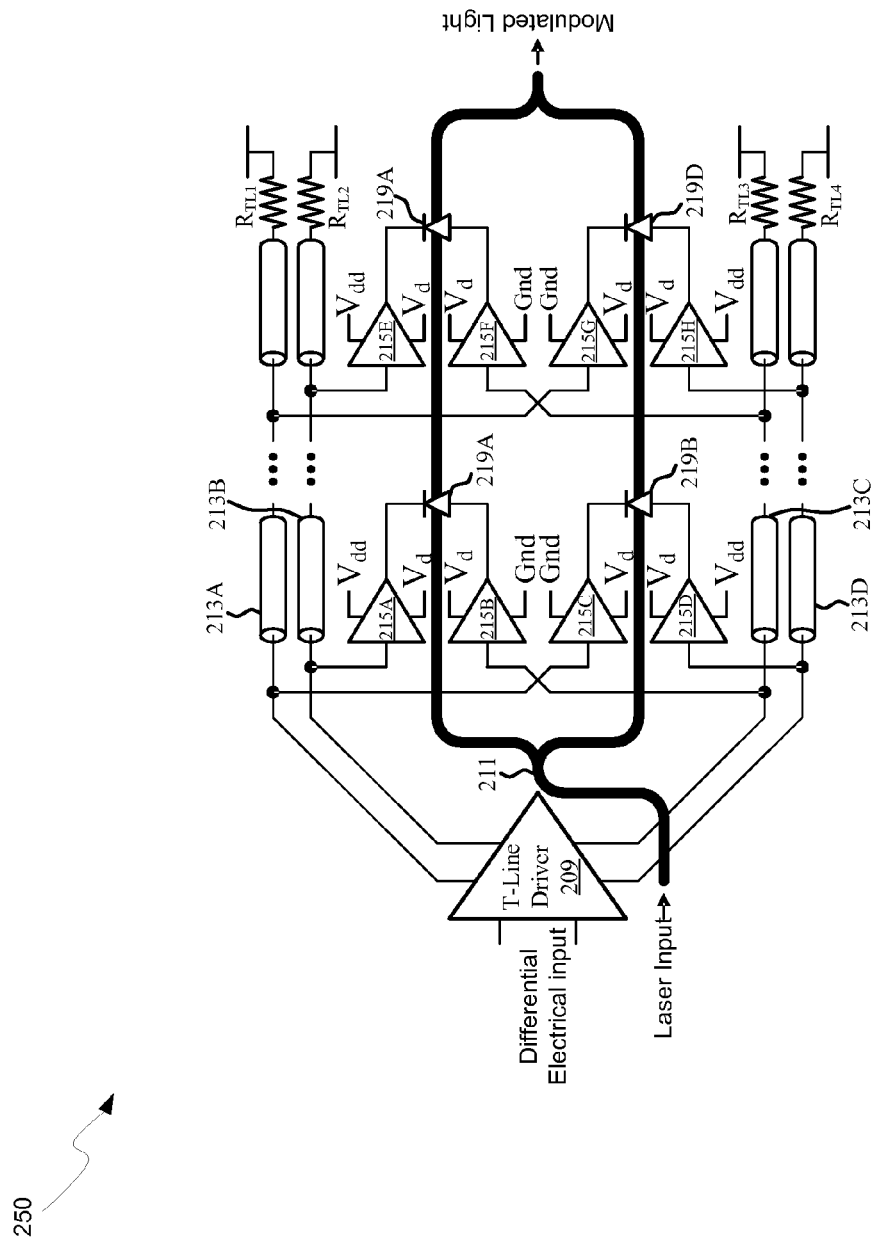
FIG. 2 is a block diagram of an exemplary split domain Mach-Zehnder modulator, in accordance with an embodiment of the invention.

FIG. 2 is a block diagram of an exemplary split domain Mach-Zehnder modulator, in accordance with an embodiment of the invention. Referring to FIG. 2, there is shown a split-domain Mach-Zehnder modulator (MZM) 250 comprising a transmission line driver 209, waveguides 211, transmission lines 213A-213D, diode drivers 215A-215H, diodes 219A-219D, and transmission line termination resistors $R_{TL1}$-$R_{TL4}$. There is also shown voltage levels $V_{dd}$, $V_d$, and Gnd. In an embodiment of the invention, $V_d$ is equal to a voltage of $V_{dd}/2$, thus generating two voltage domains, due to the symmetric nature of the stacked circuits. However, the invention is not limited to two voltage domains. Accordingly, any number of voltage domains may be utilized, dependent on the desired voltage swing of each domain and the total voltage range, defined here as $V_{dd}$ to ground. Similarly, the magnitude of the voltage range in each voltage domain may be a different value than other domains.

The transmission line (T-line) driver 209 comprises circuitry for driving transmission lines in an even-coupled mode, where the signal on each pair of transmission lines is equal except with a DC offset. In this manner, two or more voltage domains may be utilized to drive the diodes that generate index changes in the respective branches of the MZM 250. In another embodiment of the invention, the T-line driver 209 may drive transmission lines in odd-coupled mode. Even-coupled mode may result in a higher impedance in the transmission line, whereas odd-coupling may result in lower impedance.

The waveguides 211 comprise the optical components of the MZM 250 and enable the routing of optical signals around the CMOS chip 130. The waveguides 211 comprise silicon and silicon dioxide, formed by CMOS fabrication processes, utilizing the index of refraction difference between Si and $SiO_2$ to confine an optical mode in the waveguides 211. The transmission line termination resistors $R_{TL1}$-$R_{TL4}$ enable impedance matching to the T-lines 213A-213D and thus reduced reflections.

The diode drivers 215A-215H comprise circuitry for driving the diodes 219A-219D, thereby changing the index of refraction locally in the waveguides 211. This index change in turn changes the velocity of the optical mode in the waveguides 211, such that when the waveguides merge again following the driver circuitry, the optical signals interfere constructively or destructively, thus modulating the laser input signal. By driving the diodes 219A-219D with a differential signal, where a signal is driven at each terminal of a diode, as opposed to one terminal being tied to AC ground, both power efficiency and bandwidth may be increased due to the reduced voltage swing required in each domain.

In operation, a CW optical signal is coupled into the "Laser Input", and a modulating differential electrical signal is communicated to the T-line driver 209. The T-line driver 209 generates complementary electrical signals to be communicated over the T-lines 213A-213D, with each pair of signals offset by a DC level to minimize the voltage swing of each diode driver 215A-215H, while still enabling a full voltage swing across the diodes 219A-219D.

Reverse biasing the diodes 219A-219D generates field effects that change the index of refraction and thus the speed of the optical signal propagating through the waveguides 213A-213D. The optical signals then interfere constructively or destructively, resulting in the "Modulated Light" signal.

Figure 3:
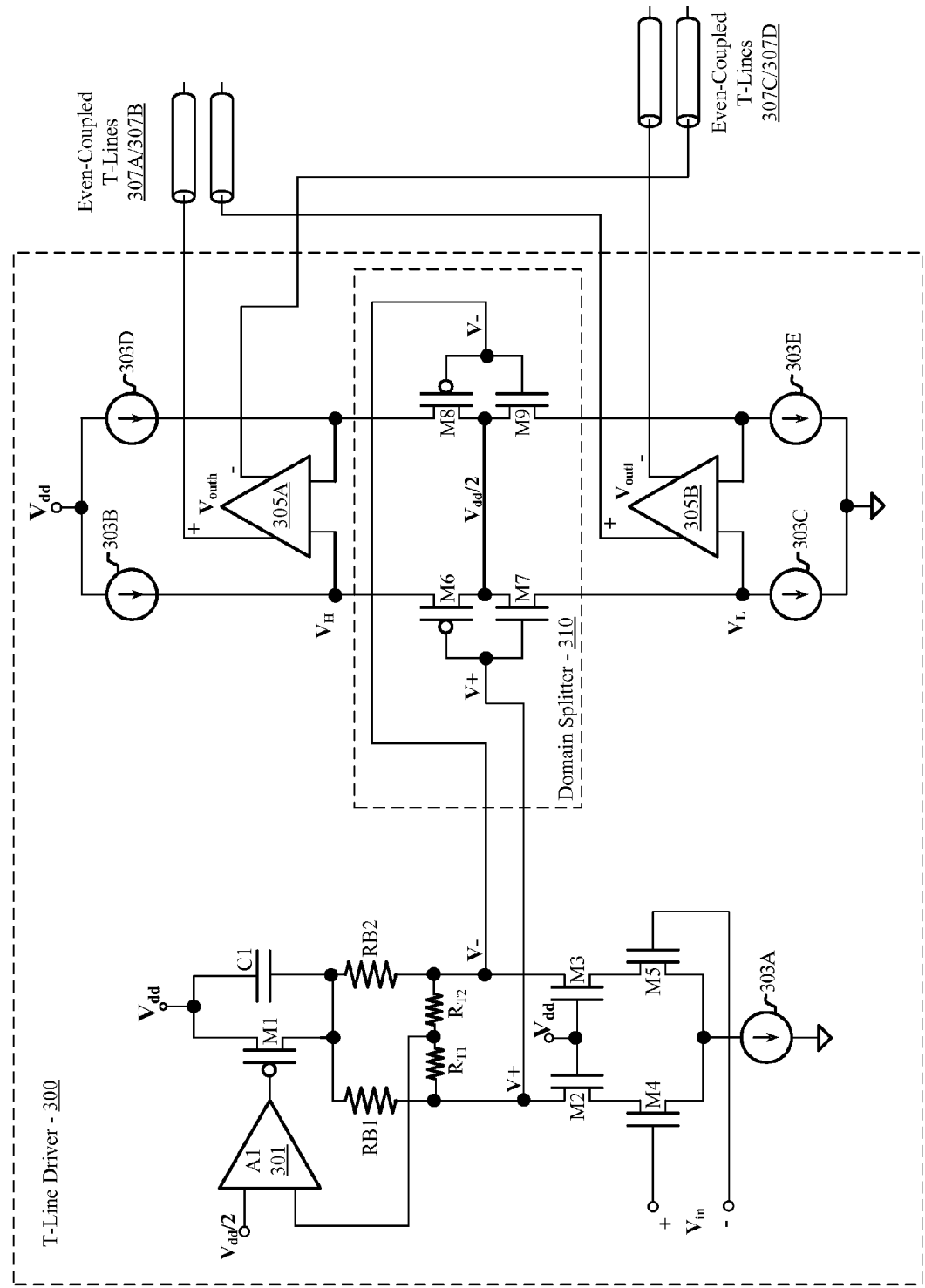
FIG. 3 is a schematic of an exemplary transmission line driver with a domain splitter circuit, in accordance with an embodiment of the invention.

FIG. 3 is a schematic of an exemplary transmission line driver with a domain splitter circuit, in accordance with an embodiment of the invention. Referring to FIG. 3, there is shown a transmission line (T-line) driver 300 and transmission lines 307A-D. The T-line driver 300 may be substantially similar to the T-line driver 209 described with respect to FIG. 2 and comprises a domain splitter 310, amplifiers 305A/305B, current sources 303A-303E, a comparator 301, bias resistors $R_{B1}$ and $R_{B2}$, resistors $R_{T1}$ and $R_{T2}$, a capacitor $C_1$, and MOSFET transistors $M_1$-$M_5$. The domain splitter 310 may be a pair of stacked source-follower pairs comprising the MOSFET transistors $M_6$-$M_9$.

The T-line driver 300 comprises a cascode circuit that may be enabled to generate the complementary inputs V+ and V− to be communicated to the domain splitter 310, although a cascode circuit is not required. The outputs V+ and V− are inverted relative to $V_{in}+$ and $V_{in}-$, and may be of smaller magnitude. Components of the circuit, such as NFETs, resistors, capacitors, and others may be so selected that the output voltages V+ and V− are approximately centered around the voltage $V_d$ in FIG. 2, typically set to be half of the full range voltage: $V_d=V_{dd}/2$, due to the symmetric nature of the stacked circuits.

The cascode T-line driver 300 may employ elements for feedback to assure the stability of the outputs, and to correct for processing variations in the circuits. Such a feedback element may be the differential amplifier 301 controlling the gate of MOSFET transistor $M_1$, which may act like an adjustable resistance in parallel with the capacitor $C_1$. In another embodiment of the invention, the MOSFET transistor M1 may act as an adjustable current source.

The differential amplifier 301 is sensitive to the magnitude and to the imbalances of the outputs V+ and V−, sampling the voltage via the two tap resistors $R_{T1}$ and $R_{T2}$ and comparing the sampled voltage to a reference voltage, which may be chosen to be $V_d$, which is equal to $V_{dd}/2$ in this exemplary embodiment. However, $V_d$, could be chosen to be any voltage within the voltage range defined by $V_{dd}$ and ground.

The domain splitter 310 comprises a pair of stacked NFET and PFET source follower circuits. The drain side of the NFET M7 and the drain side of the PFET M6 are commonly connected to $V_d$, or $V_{dd}/2$ in this exemplary embodiment. In this manner, the NFET source followers M7 and M9 are in the lower voltage domain, powered by $V_{dd}/2$ to ground, while the PFET source followers M6 and M8 are in the higher voltage domain, powered by $V_{dd}$ to $V_{dd}/2$.

The input voltages to the amplifiers 305A and 305B are coupled by electrically connecting the gate of the NFET M7 to the gate of the PFET M6, and the gate of the NFET M9 to the gate of the PFET M8. This arrangement results in the tracking of output voltages, such that if voltage V+ rises, then both voltages $V_H$ and $V_L$ will rise, and conversely, if voltage V+ falls, voltages $V_H$ and $V_L$ will also fall, thus exhibiting identical AC characteristics, but with a DC offset configured by the domain splitter 310. The full range of voltage V+ is generally not restricted to either the lower or the upper voltage domain. The rate of voltage movement, or swing, on V+, in general, is not the same as for $V_H$ and $V_L$. The ratios of the swings between voltages V+ and $V_H$ and $V_L$, respectively, depend on particular design and characteristics of the NFET and PFET source followers. However, this arrangement allows for voltage $V_L$ to essentially cover the span of the lower voltage domain, namely between "ground" and $V_d$, and for voltage $V_H$ to essentially cover the span of the upper voltage domain, namely between $V_{dd}$ and $V_d$.

The transmission lines 307A-307D are even-coupled, in that the "+" output of both the amplifiers 305A and 305B drive coupled transmission lines. Similarly, the "−" output of both amplifiers 305A and 305B drive another pair of coupled transmission lines, as described further with respect to FIG. 5.

Figure 4:
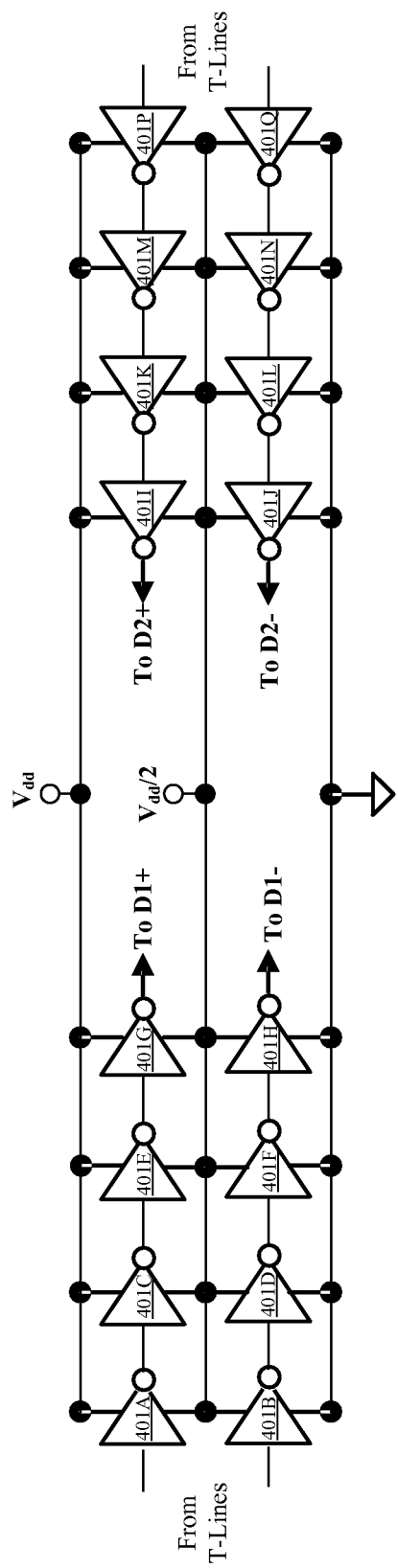
FIG. 4 is an exemplary stacked inverter unit driver, in accordance with an embodiment of the invention.

FIG. 4 is a schematic of an exemplary stacked inverter unit driver circuit, in accordance with an embodiment of the invention. Referring to FIG. 4, there is shown the unit driver circuit 400 comprising the inverters 401A-401Q. The unit driver circuit 400 is substantially similar to one stage of diode drivers, 215A-D or 215E-215H, as described with respect to FIG. 2.

The input signals to the unit driver circuit 400 comprise the signals received from transmission lines, such as the transmission lines 307A-307D, described with respect to FIG. 3. The outputs of each pair of stages, such as 401A-410H, and 401I-401Q, may be coupled to a diode, indicated by D1+/D1− and D2+/D2−. The voltage powering the upper stages of the unit driver circuit 400 is defined by $V_{dd}$ to $V_{dd}/2$, and $V_{dd}/2$ to ground for the lower stages. In this manner, each inverter stage only swings across half the entire voltage range, $V_{dd}/2$ in this exemplary embodiment, while the diodes coupled to D1+/D1− and D2+/D2− are driven across the entire voltage range $V_{dd}$ to ground.

Figure 5:
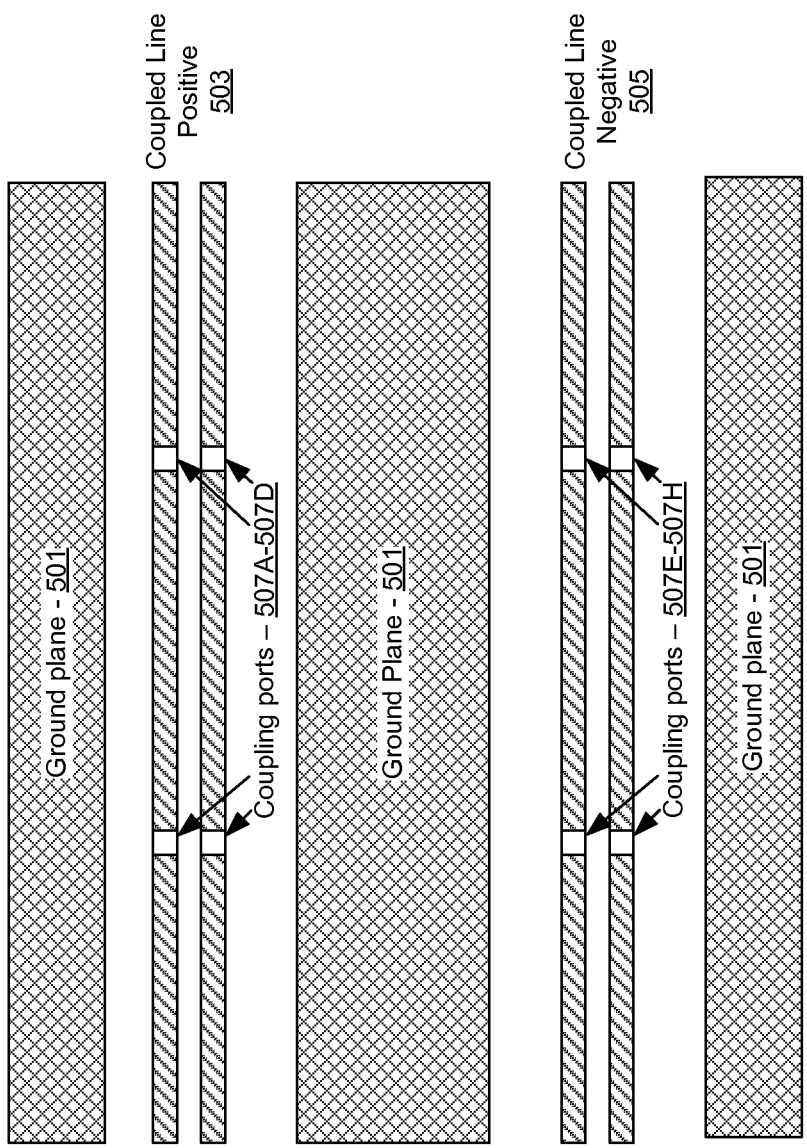
FIG. 5 is a block diagram of exemplary coupled transmission lines, in accordance with an embodiment of the invention.

FIG. 5 is a block diagram of exemplary coupled transmission lines, in accordance with an embodiment of the invention. Referring to FIG. 5, there is shown ground plane 501, coupled line positive 503, coupled line negative 505, and coupling ports 507A-507H. The transmission lines comprise a coupled line positive 503 and a coupled line negative 505 transmission line and may be defined by coplanar conductive lines on the CMOS chip 130, described with respect to FIG. 1, and surrounded on both sides by the ground plane 501. In this manner, high frequency electrical signals may be communicated over the transmission lines of a characteristic impedance, with each pair of complementary signals being identical but with a DC offset. Driving the transmission lines in even-coupled mode may result in a higher characteristic impedance. The coupling ports 507A-507H enable the coupling of signals out of the transmission lines to unit drivers, such as the unit drivers described with respect to FIG. 4.

Figure 6:
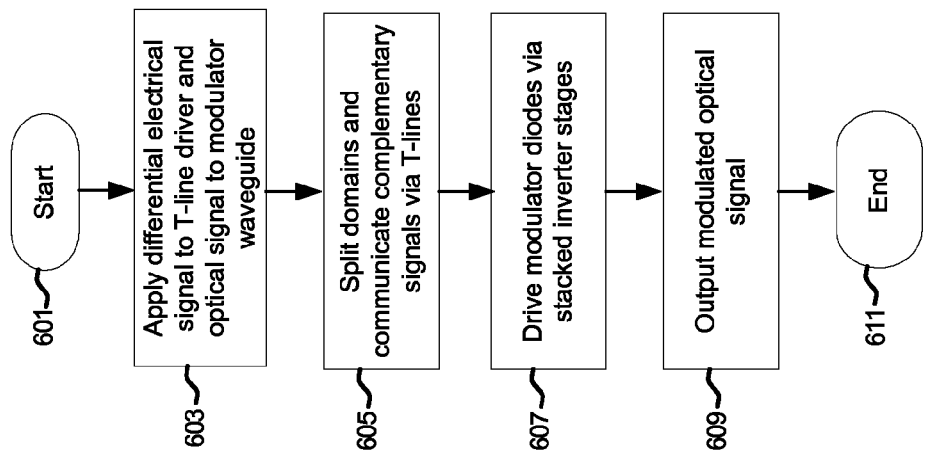
FIG. 6 is a flow chart illustrating exemplary steps in the operation of a Mach-Zehnder modulator with partial voltage domains, in accordance with an embodiment of the invention.

FIG. 6 is a flow chart illustrating exemplary steps in the operation of a Mach-Zehnder modulator with partial voltage domains, in accordance with an embodiment of the invention. In step 603, after start step 601, a differential electrical signal may be applied to the T-line driver 209 and a CW optical signal may be coupled to the waveguide 211 of the MZM 250. In step 605, the electrical signal may be amplified by different voltage domain circuitry to reduce the voltage swing in each domain and the signal may be communicated via transmission lines 213A-213D. In step 607, the signal received from the transmission lines 213A-213D may be utilized to drive stacked inverter stages 215A-215H, which in turn drive the MZM diodes 219A-219D. In step 609, the MZM diodes 219A-219D may cause constructive and/or destructive interference of the optical signals in the waveguides 211, such that a modulated optical signal may be generated, followed by end step 611.

In an embodiment of the invention, a method and system are disclosed for amplifying a received signal in a plurality of partial voltage domains. Each of the partial voltage domains may be offset by a DC voltage from the other partial voltage domains. A sum of the plurality of partial domains may be equal to a supply voltage of the integrated circuit 130. A series of diodes 215A-215H may be driven in differential mode via the amplified signals. An optical signal may be modulated via the diodes 215A-215H, which may be integrated in a Mach-Zehnder modulator 250 or a ring modulator. The diodes 215A-215H may be connected in a distributed configuration. The amplified signals may be communicated to the diodes 215A-215H via even-mode coupled transmission lines 307A-307D. The partial voltage domains may be generated via stacked source follower M6-M9 or emitter follower circuits. The voltage domain boundary value may be at one half the supply voltage due to symmetric stacked circuits.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in an integrated circuit comprising a transmission line driver:
   amplifying a received signal in a plurality of partial voltage domains;
   generating said partial voltage domains in a domain splitter in said transmission line driver wherein each of said partial voltage domains is offset by a DC voltage from other of said partial voltage domains and wherein a sum of said plurality of partial domains is equal to a supply voltage of said integrated circuit; and
   controlling a voltage domain boundary value between two partial voltage domains utilizing a differential amplifier that samples an output voltage of a cascade amplifier that is an input to the transmission line driver and controls a current supplying said cascade amplifier.

2. The method according to claim 1, comprising driving a series of diodes in differential mode via said amplified signals.

3. The method according to claim 2, comprising modulating an optical signal via said diodes.

4. The method according to claim 2, wherein said diodes are integrated in a Mach-Zehnder modulator.

5. The method according to claim 2, wherein said diodes are integrated in a ring modulator.

6. The method according to claim 2, wherein said diodes are connected in a distributed configuration.

7. The method according to claim 2, comprising communicating said amplified signals to said diodes via transmission lines.

8. The method according to claim 7, wherein said transmission lines are even-mode coupled.

9. The method according to claim 1, comprising generating said partial voltage domains via stacked source follower circuits.

10. The method according to claim 1, comprising generating said partial voltage domains via stacked emitter follower circuits.

11. The method according to claim 1, comprising generating said voltage domain boundary value of one half the supply voltage via symmetric stacked circuits.

12. A system for processing signals, the system comprising:
one or more circuits in an integrated circuit comprising a transmission line driver, said one or more circuits operable to:
amplify a received signal in a plurality of partial voltage domains;
generate said partial voltage domains in a domain splitter in said transmission line driver, wherein each of said partial voltage domains is offset by a DC voltage from other said partial voltage domains and wherein a sum of said plurality of partial domains is equal to a supply voltage of said integrated circuit; and
control a voltage domain boundary value between two partial voltage domains utilizing a differential amplifier that samples an output voltage of a cascade amplifier that is an input to the transmission line driver and controls a current supplying said cascade amplifier.

13. The system according to claim 12, wherein said one or more circuits drives a series of diodes in differential mode via said amplified signals.

14. The system according to claim 13, wherein said one or more circuits modulates an optical signal via said diodes.

15. The system according to claim 13, wherein said diodes are integrated in a Mach-Zehnder modulator.

16. The system according to claim 13, wherein said diodes are integrated in a ring modulator.

17. The system according to claim 13, wherein said diodes are connected in a distributed configuration.

18. The system according to claim 13, wherein said one or more circuits communicates said amplified signals to said diodes via transmission lines.

19. The system according to claim 18, wherein said transmission lines are even-mode coupled.

20. The system according to claim 12, wherein said one or more circuits generates said partial voltage domains via stacked source follower circuits.

21. The system according to claim 12, wherein said one or more circuits generates said partial voltage domains via stacked emitter follower circuits.

22. The system according to claim 12, wherein said one or more circuits generates said voltage domain boundary value of one half the supply voltage via symmetric stacked circuits.

* * * * *

UNITED STATES PATENT AND TRADEMARK OFFICE
CERTIFICATE OF CORRECTION

PATENT NO.        : 8,687,981 B2                                               Page 1 of 1
APPLICATION NO.   : 12/208650
DATED             : April 1, 2014
INVENTOR(S)       : Welch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1562 days.

Signed and Sealed this
Thirtieth Day of May, 2017

Michelle K. Lee
*Director of the United States Patent and Trademark Office*